US009781336B2

(12) United States Patent
Yoshio et al.

(10) Patent No.: US 9,781,336 B2
(45) Date of Patent: Oct. 3, 2017

(54) OPTIMUM CAMERA SETTING DEVICE AND OPTIMUM CAMERA SETTING METHOD

(71) Applicant: PANASONIC CORPORATION, Osaka (JP)

(72) Inventors: Hiroaki Yoshio, Kanagawa (JP); Kaori Mori, Kanagawa (JP); Sumio Yokomitsu, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 633 days.

(21) Appl. No.: 14/374,544

(22) PCT Filed: Jan. 29, 2013

(86) PCT No.: PCT/JP2013/000468
§ 371 (c)(1),
(2) Date: Jul. 25, 2014

(87) PCT Pub. No.: WO2013/114862
PCT Pub. Date: Aug. 8, 2013

(65) Prior Publication Data
US 2014/0362215 A1 Dec. 11, 2014

(30) Foreign Application Priority Data

Jan. 30, 2012 (JP) ................................ 2012-016700

(51) Int. Cl.
*H04N 7/18* (2006.01)
*H04N 5/232* (2006.01)
(Continued)

(52) U.S. Cl.
CPC ..... *H04N 5/23219* (2013.01); *G06K 9/00221* (2013.01); *G06K 9/00771* (2013.01);
(Continued)

(58) Field of Classification Search
None
See application file for complete search history.

(56) References Cited

U.S. PATENT DOCUMENTS 7,613,325 B2 * 11/2009 Iwasaki ............. G06K 9/00348
348/143
8,520,068 B2 * 8/2013 Naidoo ............ G08B 13/19645
348/143
(Continued)

FOREIGN PATENT DOCUMENTS

JP 2000-138856 A 5/2000
JP 2002-027435 1/2002
(Continued)

OTHER PUBLICATIONS

U.S. Appl. No. 14/326,683 to Takeshi Fujimatsu et al., filed Jul. 9, 2014.
(Continued)

*Primary Examiner* — James M Anderson, II
(74) *Attorney, Agent, or Firm* — Greenblum & Bernstein, P.L.C.

(57) ABSTRACT

Provided are a camera that images a subject; a person tracking portion that detects a person from an image which is captured by the camera and tracks the detected person; a person interpretation portion that extracts items including a number of face detections, a movement direction, a facing direction, a focus, a dynamic range and a view angle as store visitor information with respect to the person who is tracked by the person tracking portion; a camera installation condition estimation unit that estimates whether installation conditions including an installation position, a height, the view angle and the focus of the camera are appropriate based on the store visitor information which is extracted by the person interpretation portion; and a user presentation unit that
(Continued)

(a)

(b)

presents a result estimated by the camera installation condition estimation unit.

8 Claims, 16 Drawing Sheets

(51) Int. Cl.
    *G06K 9/00*     (2006.01)
    *G06K 9/62*     (2006.01)

(52) U.S. Cl.
    CPC ....... *G06K 9/6253* (2013.01); *H04N 5/23212* (2013.01); *H04N 5/23296* (2013.01)

(56) References Cited

U.S. PATENT DOCUMENTS

| | | | |
|---|---|---|---|
| 2005/0089197 A1* | 4/2005 | Iwasaki | G07C 9/00158 382/115 |
| 2007/0115363 A1 | 5/2007 | Nakamura | |
| 2009/0096871 A1* | 4/2009 | Kuwano | G06K 9/00228 348/169 |
| 2009/0268074 A1 | 10/2009 | Sugino | |
| 2010/0033579 A1 | 2/2010 | Yokohata et al. | |
| 2010/0177159 A1 | 7/2010 | Tojo | |
| 2010/0245532 A1* | 9/2010 | Kurtz | G06K 9/00711 348/14.03 |
| 2011/0019027 A1 | 1/2011 | Fujita et al. | |
| 2011/0043628 A1 | 2/2011 | Yun | |
| 2013/0010095 A1 | 1/2013 | Aoki et al. | |
| 2013/0022246 A1 | 1/2013 | Tayama et al. | |
| 2013/0027561 A1 | 1/2013 | Lee et al. | |
| 2013/0030875 A1 | 1/2013 | Lee et al. | |
| 2013/0129160 A1 | 5/2013 | Yamada et al. | |
| 2013/0278774 A1 | 10/2013 | Fujimatsu et al. | |
| 2014/0222501 A1 | 8/2014 | Hirakawa et al. | |

FOREIGN PATENT DOCUMENTS

| | | |
|---|---|---|
| JP | 2008-172425 | 7/2008 |
| JP | 2010-161718 | 7/2010 |
| JP | 2012-213124 | 11/2012 |

OTHER PUBLICATIONS

U.S. Appl. No. 14/326,690 to Sonoko Hirasawa et al., filed Jul. 9, 2014.
U.S. Appl. No. 14/326,510 to Takeshi Fujimatsu et al., filed Jul. 9, 2014.
U.S. Appl. No. 14/496,055 to Yuichi Matsumoto et al., filed Sep. 25, 2014.
Search report from International Search Report in PCT/JP2013/000468, dated Apr. 9, 2013.
Search report from E.P.O., dated Nov. 6, 2014.

\* cited by examiner

FIG. 2

| SETTING ITEMS | DESCRIPTION |
|---|---|
| NUMBER OF FACIAL CONTOURS: THRESHOLD VALUE | RATIO OF NUMBER OF PERSONS EXCEEDING SET THRESHOLD VALUE IS OUTPUT AS VALIDITY RATE. |
| MOVEMENT DIRECTION: SELECTION OF DIRECTION TO BE VALID | DIRECTION IS DESIGNATED TO BE VALID AMONG EIGHT DIRECTIONS. RATIO OF NUMBER OF PERSONS WHO HAVE MOVED IN DESIGNATED DIRECTION IS OUTPUT AS VALIDITY RATE. |
| FACING DIRECTION: THRESHOLD VALUE OF NUMBER OF FRONTAL FACE | RATIO OF NUMBER OF PERSONS EXCEEDING SET THRESHOLD VALUE (NUMBER OF SHOTS) IS OUTPUT AS VALIDITY RATE. |
| FOCUS: OK THRESHOLD VALUE | RATIO OF NUMBER OF PERSONS EXCEEDING SET THRESHOLD VALUE (NUMBER OF SHOTS) IS OUTPUT AS VALIDITY RATE. |
| D-RANGE OF FACE: OK THRESHOLD VALUE | RANGE OF LUMINANCE VALUE IN FACIAL REGION IS DETERMINED WHETHER IT IS IN OK STATE, AND RATIO OF NUMBER OF PERSONS OF WHICH NUMBER OF SHOTS IN OK STATE EXCEEDS THRESHOLD VALUE IS OUTPUT AS VALIDITY RATE. |
| VIEW ANGLE | AN IMAGE IS DIVIDED INTO TWO PORTIONS, UPPER AND LOWER HALVES, AND NUMBER (Tn) OF FACE DETECTION ON UPPER SIDE AND NUMBER (Bn) OF FACE DETECTION ON LOWER SIDE ARE COUNTED. VALIDITY RATE IS OUTPUT IN FORM OF Tn/Bn (EQUAL TO OR GREATER THAN 1 IS COUNTED AS 1). |

FIG. 5

| Ratio of number of persons exceeding threshold value of number of facial contours | Ratio of number of persons for each direction (including facing direction) | Frequency map of face detection for each sub-region | Average size of detected face in each sub-region | Determining necessity of correction (contents of presentation) |
|---|---|---|---|---|
| Equal to or greater than ratio M% | — | — | — | No correction required |
| | UP → DOWN: FEW ≈ MOSTLY OBLIQUE | — | — | Correction required ⇒ Change position: Movement route to be straight! |
| Lower than ratio M% | | Frequency of lower half region is high ≈ face cannot be imaged at entrance | Size of detected face in upper half region is small | Correction required ⇒ Zoom in |
| | | | Other than above | Correction required ⇒ Change position: to be lowered in installation height and to be lengthened in distance between camera and entrance ※ State where there are plenty of persons looking down in vicinity of entrance |
| | UP → DOWN: PLENTY | Frequency of upper half region is high ≈ face cannot be imaged at only entrance | Size of detected face in upper half region is large | Correction required ⇒ Wide angle |
| | | | Other than above | Correction required ⇒ Change position: to be lowered in installation height and to be lengthened in distance between camera and entrance ※ State where angle of depression (facing direction) of camera is great |

FIG. 8
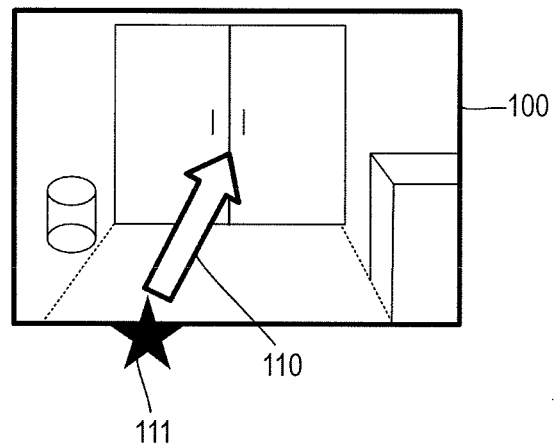
(a)
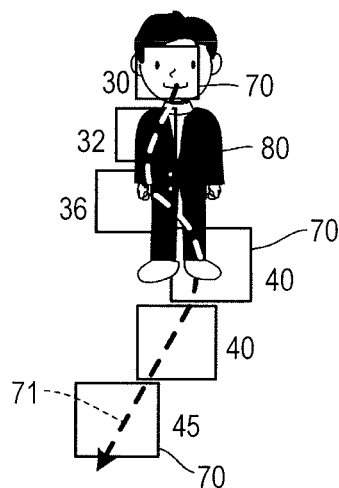
(b)

30 DEGREES TO RIGHT AND LEFT
FRONTAL FACE

OPTIMUM CAMERA SETTING DEVICE AND OPTIMUM CAMERA SETTING METHOD

TECHNICAL FIELD

The present invention relates to an optimum camera setting device and an optimum camera setting method which are suitable to be used in a monitoring camera system for monitoring persons.

BACKGROUND ART

Monitoring cameras which are permanently installed in buildings such as stores like convenience stores, banks and public facilities are installed by a builder. However, zooming, panning and tilting need to be individually adjusted, resulting in troublesome work. As a method to make an installation of a monitoring camera efficient, Patent Literature 1 discloses an example in which the zooming, the panning and the tilting of the monitoring camera are individually and automatically adjusted based on a store layout and the like.

CITATION LIST

Patent Literature

Patent Literature 1: JP-A-2008-172425

SUMMARY OF INVENTION

Technical Problem

When performing image recognition processing such as facial collating, and estimating of age and gender with a monitoring camera, there is a need to set an installation position, a height, a view angle, a focus and the like of the camera which are optimum for the processing. However, the technology in the related art including the monitoring camera system disclosed in Patent Literature 1 described above does not have section to present installation conditions such as the installation position, the height, the view angle and the focus of the camera which are optimum for the image recognition processing such as the facial collating, and the estimating of age and gender to a user (mainly, to a builder who installs the monitoring camera system). Therefore, the builder has to set the installation position, the height, the view angle, the focus and the like of the camera through trial and error. That has become a factor of deterioration of work efficiency.

The present invention has been made taking the foregoing circumstances into consideration, and an object of the present invention is to provide an optimum camera setting device and an optimum camera setting method in which a user can be presented with the installation conditions including the installation position, the height, the view angle and the focus of the camera which are optimum for the image recognition processing such as the facial collating, and the estimating of age and gender.

Solution to Problem

An optimum camera setting device according to an aspect of the present invention includes: a person tracking section, configured to detect a person from an image captured by a camera which images a subject and to track the detected person; a person interpretation section, configured to extract at least any one of a number of face detections, a facing direction and a view angle as store visitor information with respect to the person who is tracked through the person tracking section; and a camera installation condition estimation section, configured to estimate whether an installation condition of the camera is appropriate based on the store visitor information which is extracted through the person interpretation section.

According to the configuration described above, a user is presented with installation conditions including an installation position, a height, a view angle and a focus of a camera which are optimum for image recognition processing such as facial collating, and estimating of age and gender so that setting of the installation position, the height, the view angle and the focus of the camera can be simply performed, thereby achieving an improvement in operational efficiency.

In the configuration described above, the camera installation condition estimation section presents an attention to cause the camera to move right in front of a person in a movement direction when a validity rate of the movement direction of the person is low.

According to the configuration described above, the validity rate can be raised by only moving the camera in accordance with the presentation, thereby achieving an improvement in the operational efficiency.

In the configuration described above, the person interpretation section divides a captured image into small regions and creates the store visitor information for each small region in addition to the store visitor information for each tracked person.

According to the configuration described above, the validity rate of the view angle can be raised, thereby achieving an improvement in the operational efficiency.

In the configuration described above, the camera installation condition estimation section redivides the store visitor information for each small region into an upper half and a lower half of a captured image and calculates a validity rate at a frequency of the upper half and the lower half.

According to the configuration described above, the face of a store visitor can be securely acquired and the validity rate of the view angle can be raised by causing the upper half of the captured image to face an entrance of the store, thereby achieving an improvement in the operational efficiency.

In the configuration described above, the camera installation condition estimation section presents an attention to cause the camera to be wide-angled when the number of face detections in the upper half of the captured image is greater than that in the lower half thereof.

According to the configuration described above, the face of the store visitor can be securely acquired so that the validity rate of the view angle can be raised, thereby achieving an improvement in the operational efficiency.

In the configuration described above, the camera installation condition estimation section presents an attention to cause the camera to zoom in when the number of face detections in the lower half of the captured image is greater than that in the upper half thereof.

According to the configuration described above, the face of the store visitor can be securely acquired by causing the camera to zoom in when there are more images of the face captured at the lower half of the captured image so that the validity rate of the view angle can be raised, thereby achieving an improvement in the operational efficiency.

In the configuration described above, the camera installation condition estimation section sets a validity criterion for the store visitor information for each tracked person and outputs a ratio of the number of persons exceeding the validity criterion as the validity rate.

According to the configuration described above, there is provided the validity criterion for the store visitor information for each tracked person and the ratio of the number of persons exceeding the validity criterion is presented as the validity rate so that the setting of the installation position, the height, the view angle and the focus of the camera can be simply performed, thereby achieving an improvement in the operational efficiency.

In the configuration described above, the camera installation condition estimation section determines which one of the installation conditions including an installation position, a height, a view angle and a focus of the camera is to be corrected based on the validity rate and outputs the determined one.

According to the configuration described above, it is clarified which one of the installation conditions including the installation position, the height, the view angle and the focus of the camera is to be corrected, thereby achieving an improvement in the operational efficiency.

In the configuration described above, the camera installation condition estimation section presents an attention to cause a resolution and a frame rate of the camera to change.

According to the configuration described above, the resolution and the frame rate of the camera can be easily changed.

An optimum camera setting method according to an aspect of the present invention includes: a person tracking step of detecting a person from an image captured by a camera which images a subject and tracking the detected person; a person interpretation step of extracting a number of face detections, a facing direction and a view angle as store visitor information with respect to the person who is tracked through the person tracking step; and a camera installation condition estimation step of estimating whether an installation condition of the camera is appropriate based on the store visitor information which is extracted through the person interpretation step.

According to the method described above, a user is presented with the installation conditions including an installation position, a height, a view angle and a focus of a camera which are optimum for image recognition processing such as facial collating, and estimating of age and gender so that setting of the installation position, the height, the view angle and the focus of the camera can be simply performed, thereby achieving an improvement in the operational efficiency.

An optimum camera setting device according to an aspect of the present invention includes: a movement route extraction section, configured to track a person from an image of a person who is captured by a camera which images an imaging range and acquiring a movement route of the person; a facing direction detection section, configured to detect a facing direction of the person who moves in the movement route; an imaging range settlement section, configured to settle the imaging range of the camera to change, where there is one section of the movement route in which the facing direction of the person who is detected by the facing direction detection section exhibits a frontal face, the imaging range settlement section settles the imaging range of the camera to change to the section in which the frontal face is detected when a number of shots of the frontal face in the section is equal to or greater than a predetermined number of shots, and settles a lower side of the imaging range of the camera to change in a lower side of the range of the section in which the frontal face is detected when the number of shots of the frontal face in the section is less than a predetermined number of shots; and a presentation section, configured to present the imaging range which is settled by the imaging range settlement section.

According to the configuration described above, where there is one section of the movement route in which the facing direction of the person exhibits the frontal face and when the number of shots of the frontal face in the section is equal to or greater than a predetermined number of shots, presentation is carried out so as to set the imaging range of the camera to be the section, and when the number of shots of the frontal face in the section is less than a predetermined number of shots, presentation is carried out so as to set the lower side of the imaging range of the camera to be the lower side of the range of the section, and thus, more frontal faces can be imaged. Therefore, a functional improvement thereof can be achieved when used as a monitoring camera.

In the configuration described above, the imaging range settlement section changes the imaging range when a ratio of the frontal face of the person who is detected by the facing direction detection section and moves along the movement route is equal to or lower than a predetermined ratio.

According to the configuration described above, the presentation of change in the imaging range is carried out only when necessary, and thus, more frontal faces can be reliably imaged.

In the configuration described above, where there are two or more sections of the movement routes in each of which the facing direction of the person who is detected by the facing direction detection section exhibits the frontal face, and when the number of images in each of which the frontal face of the person is detected is equal to or greater than a predetermined number of shots in one section out of the two or more sections, the imaging range settlement section settles the imaging range of the camera to change in the one section out of the two or more sections.

According to the configuration described above, where there are two or more sections of the movement routes in each of which the facing direction of the person exhibits the frontal face, and when the number of shots of the frontal face in any one section out of the two or more sections is equal to or greater than a predetermined number of shots, presentation is carried out so as to set the imaging range of the camera to be the one section out of the two or more sections. Therefore, when there are two or more sections of the movement routes in each of which the facing direction of the person exhibits the frontal face, the presentation is carried out so as to set the imaging range of the camera to be the section in which the number of shots of the frontal faces is the most, and thus, more frontal faces can be imaged.

In the configuration described above, where there are two or more sections of the movement routes in each of which the facing direction of the person who is detected by the facing direction detection section exhibits the frontal face, when the number of images in each of which the frontal face of the person is detected is less than a predetermined number of shots in every section of the two or more sections, the imaging range settlement section sets the imaging range to be from the uppermost section to the lowermost section of the imaging range out of the two or more sections of the imaging range.

According to the configuration described above, where there are two or more sections of the movement routes in each of which the facing direction of the person exhibits the frontal face, when the number of images in each of which the frontal face of the person is detected is less than a predetermined number of shots regarding every section of the two or more sections, presentation is carried out so as to set the imaging range of the camera to be from the uppermost section to the lowermost section of the imaging range out of the two or more sections, and thus, more frontal faces can be imaged.

In the configuration described above, a movement route division section, configured to divide the movement route in accordance with a degree of the facing direction of the person who is detected by the facing direction detection section is included, and the imaging range settlement section adjusts the camera to focus on a section in which the degree of the facing direction is close to that of the frontal face.

According to the configuration described above, the section in which the degree of the facing direction is close to that of the frontal face is focused on, and thus, more frontal faces can be favorably imaged.

In the configuration described above, the imaging range settlement section adjusts the camera to focus on a section in which there are many shots of the frontal face among the sections in which the facing direction is close to that of the frontal face.

According to the configuration described above, more frontal faces can be favorably imaged.

In the configuration described above, the number of images in each of which the frontal face of the person is detected is an average of the numbers of shots in each of which the frontal face of the person who is detected by the facing direction detection section and moves along the detected movement route.

According to the configuration described above, more frontal faces can be favorably imaged.

In the configuration described above, the number of face images in each of which the face of the person who moves along the movement route is detected is an average of the numbers of shots of the face of the person who is detected by the facing direction detection section and moves along the movement route.

According to the configuration described above, more frontal faces can be favorably imaged.

An optimum camera setting method according to an aspect of the present invention is a camera setting method for displaying setting of a camera by using a calculator, the method including: an imaging step of capturing an imaging range; a movement route extraction step of tracking a person from an image of the person who is imaged through the imaging step to acquire a movement route of the person; a facing direction detection step of detecting a facing direction of the person who moves in the movement route; an imaging range settlement step of settling the imaging range in the imaging step, where there is one section of the movement route in which the facing direction of the person who is detected in the facing direction detection step exhibits a frontal face, the imaging range settlement step settles the imaging range of the camera to change to the section in which the frontal face is detected when a number of shots of the frontal face in the section is equal to or greater than a predetermined number of shots, and settles a lower side of the imaging range of the camera to change in a lower side of the range of the section in which the frontal face is detected when the number of shots of the frontal face in the section is less than a predetermined number of shots; and a presentation step of presenting the imaging range which is settled through the imaging range settlement step.

According to the method described above, where there is one section of the movement route in which the facing direction of the person exhibits the frontal face, and when the number of shots of the frontal face in the section is equal to or greater than a predetermined number of shots, presentation is carried out so as to set the imaging range of the camera to be the section, and when the number of shots of the frontal face in the section is less than a predetermined number of shots, presentation is carried out so as to set the lower side of the imaging range of the camera to be the lower side of the range of the section, and thus, more frontal faces can be imaged.

Advantageous Effects of Invention

According to the present invention, setting of an installation position, a height, a view angle and a focus of a camera can be simply performed, thereby achieving an improvement in operational efficiency.

BRIEF DESCRIPTION OF DRAWINGS

FIG. 2 describes setting and a definition of a validity rate in a camera installation validity rate calculation portion of the optimum camera setting device in FIG. 1.

FIG. 5 illustrates an example of determining necessity of correction for camera installation in a camera installation correction necessity determination portion of the optimum camera setting device in FIG. 1.

In FIG. 8, (a) and (b) are views illustrating an example in which a correction suggestion is presented by using an image in the optimum camera setting device in FIG. 1.

DESCRIPTION OF EMBODIMENTS

Hereinafter, suitable embodiments to carry out the present invention will be described in detail with reference to the drawings.

(Embodiment 1)

Figure 1:
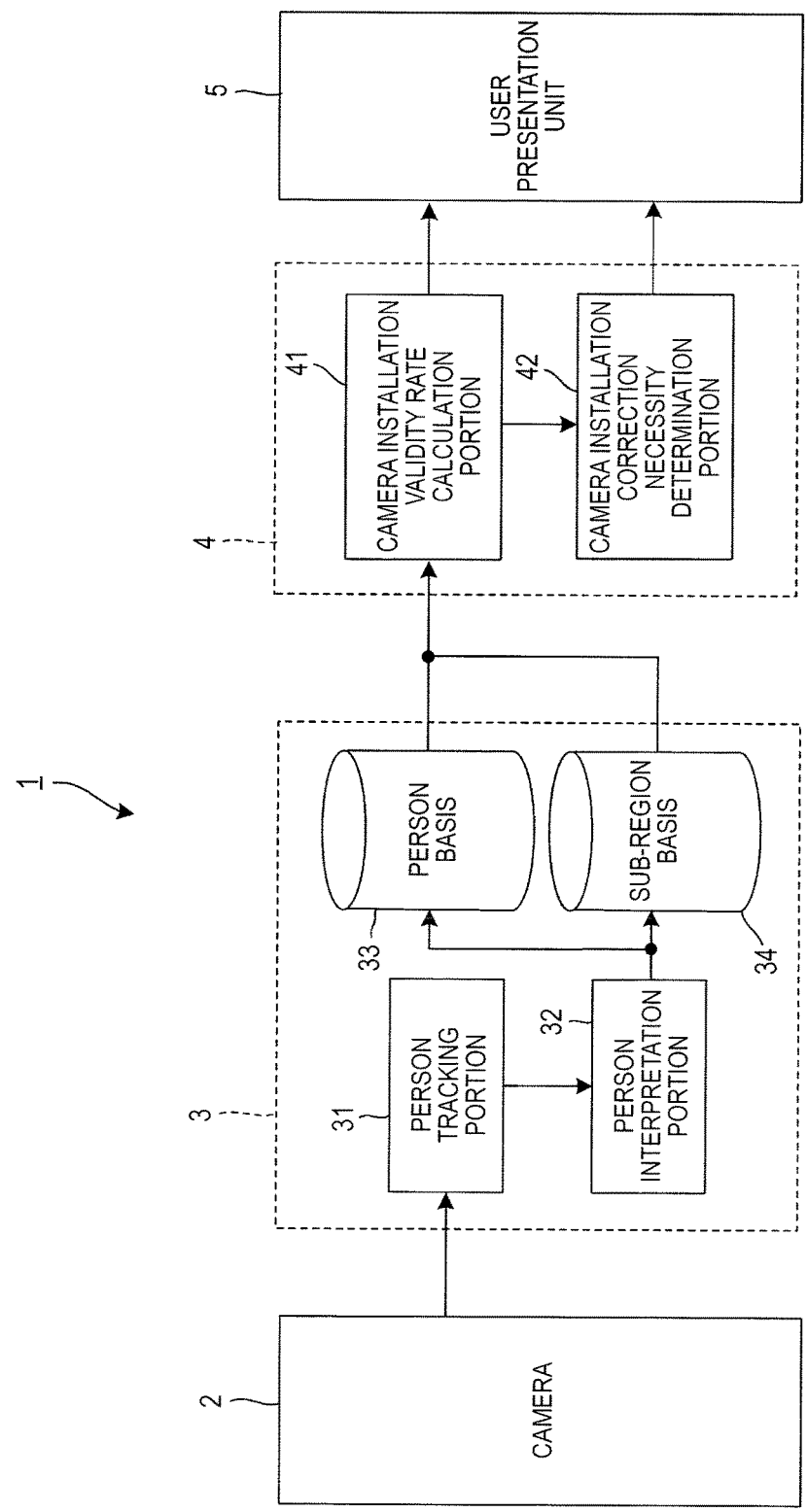
FIG. 1 is a block diagram illustrating a schematic configuration of an optimum camera setting device according to Embodiment 1 of the present invention.

FIG. 1 is a block diagram illustrating a schematic configuration of an optimum camera setting device according to Embodiment 1 of the present invention. In the drawing, an optimum camera setting device 1 of the present embodiment includes a camera 2 that images a subject, a store visitor tendency analysis unit 3, a camera installation condition estimation unit 4 and a user presentation unit 5. The camera 2 has image sensors such as a CCD (charge coupled device) and a CMOS (complementary metal oxide semiconductor), thereby outputting an image captured by the image sensors.

The store visitor tendency analysis unit 3 includes a person tracking portion 31, a person interpretation portion 32, a person-basis store visitor information storage portion 33 and a sub-region-basis store visitor information storage portion 34. The person tracking portion 31 detects a person from an image which is captured by a camera 2 and tracks the detected person. The person interpretation portion 32 extracts items including the number of face detections, a movement direction, a facing direction, a focus, a dynamic range and a view angle as store visitor information with respect to the person who is tracked by the person tracking portion 31. The person interpretation portion 32 divides a captured image into small regions (hereinafter, referred to as a "sub-region") and creates the store visitor information for each small region in addition to the store visitor information for each tracked person. Here, the store visitor information on a sub-region basis denotes information regarding the view angle. The store visitor information on a person basis denotes information regarding setting items (setting items will be described afterwards) other than the view angle.

The person-basis store visitor information storage portion 33 stores the store visitor information which is created on a person basis. The sub-region-basis store visitor information storage portion 34 stores the store visitor information which is created on a sub-region basis. The person-basis store visitor information storage portion 33 and the sub-region-basis store visitor information storage portion 34 are configured to be a storage unit such as a hard disk or a flash memory. In the optimum camera setting device 1 according to the present embodiment, the person-basis store visitor information storage portion 33 and the sub-region-basis store visitor information storage portion 34 are configured to be in one storage unit. However, the storage portions 33 and 34 may be respectively configured to be in exclusive storage units.

The camera installation condition estimation unit 4 estimates whether installation conditions including an installation position, a height, the view angle and the focus of the camera 2 are appropriate based on the store visitor information on a person basis or on a sub-region basis which is extracted by the person interpretation portion 32 of the store visitor tendency analysis unit 3, and has a camera installation validity rate calculation portion 41 and a camera installation correction necessity determination portion 42. The camera installation validity rate calculation portion 41 sets a validity criterion for the store visitor information for each tracked person (that is, on a person basis) and outputs a ratio of the number of persons exceeding the validity criterion as a validity rate. The camera installation validity rate calculation portion 41 redivides the store visitor information for each sub-region (that is, on a sub-region basis) into an upper half and a lower half of the captured image and calculates the validity rate at a frequency of the upper half and the lower half.

FIG. 2 describes setting and a definition of the validity rate in the camera installation validity rate calculation portion 41. In the drawing, as setting items of the validity rate, there are six setting items such as "the number of facial contours: threshold value", "movement direction: selection of direction to be valid", "facing direction: threshold value of the number of frontal faces", "focus: OK threshold value", "D-range ("D" denotes dynamic) of face: OK threshold value" and "view angle". The threshold value which is set for "the number of facial contours" is "10", for example. The ratio of the number of persons exceeding the set threshold value is output as the validity rate for "the number of facial contours". For example, when the threshold value is set to "10", the ratio of the number of persons exceeding "10" out of 89 persons (an example of the number of persons who have visited a store for ten minutes) is output as the validity rate. A direction is designated to be validated among eight directions within 180 degrees, for example, and a ratio of the number of persons who have moved in the designated direction is output as the validity rate for the "movement direction".

A ratio of the number of persons exceeding a set threshold value (number of shots) is output as the validity rate for the "facing direction". The threshold value which is set for the "facing direction" is "three to five shots", for example. A ratio of the number of persons exceeding a set threshold value (number of shots) is output as the validity rate for the "focus". The threshold value which is set for the "focus" is "three to five shots", for example. Whether a range of a luminance value in a facial region is in an OK state is determined, and a ratio of the number of persons of which the number of shots in the OK state exceeds a threshold value is output as the validity rate for the "D-range of face". The threshold value which is set for the "D-range of face" is "three to five shots", for example. An image is divided into two portions, upper and lower halves, and the number (Tn) of face detections on the upper side and the number (Bn) of face detections on the lower side are counted for the "view angle". The validity rate is output in a form of Tn/Bn (equal to or greater than 1 is counted as 1).

Returning to FIG. 1, the camera installation correction necessity determination portion 42 utilizes the validity rate which is calculated in the camera installation validity rate calculation portion 41 to determine which one of the installation conditions including the installation position, the height, the view angle and the focus of the camera 2 is to be corrected, thereby outputting the information to the user presentation unit 5. Particularly, when the validity rate of the movement direction of a person is low, the camera installation correction necessity determination portion 42 outputs an attention to the user presentation unit 5 so as to cause the camera 2 to move right in front of the person in the movement direction. When the number of face detections in the upper half of the captured image is greater than that in the lower half, an attention to cause the camera 2 to be wide-angled is output to the user presentation unit 5. When the number of face detections in the lower half of the captured image is greater than that in the upper half, an attention to cause the camera 2 to zoom in is output to the user presentation unit 5.

The user presentation unit 5 has a display such as a liquid crystal indicator and the like, and presents a result which is estimated by the camera installation condition estimation unit 4, and an instruction (that is, "displays").

Figure 3:
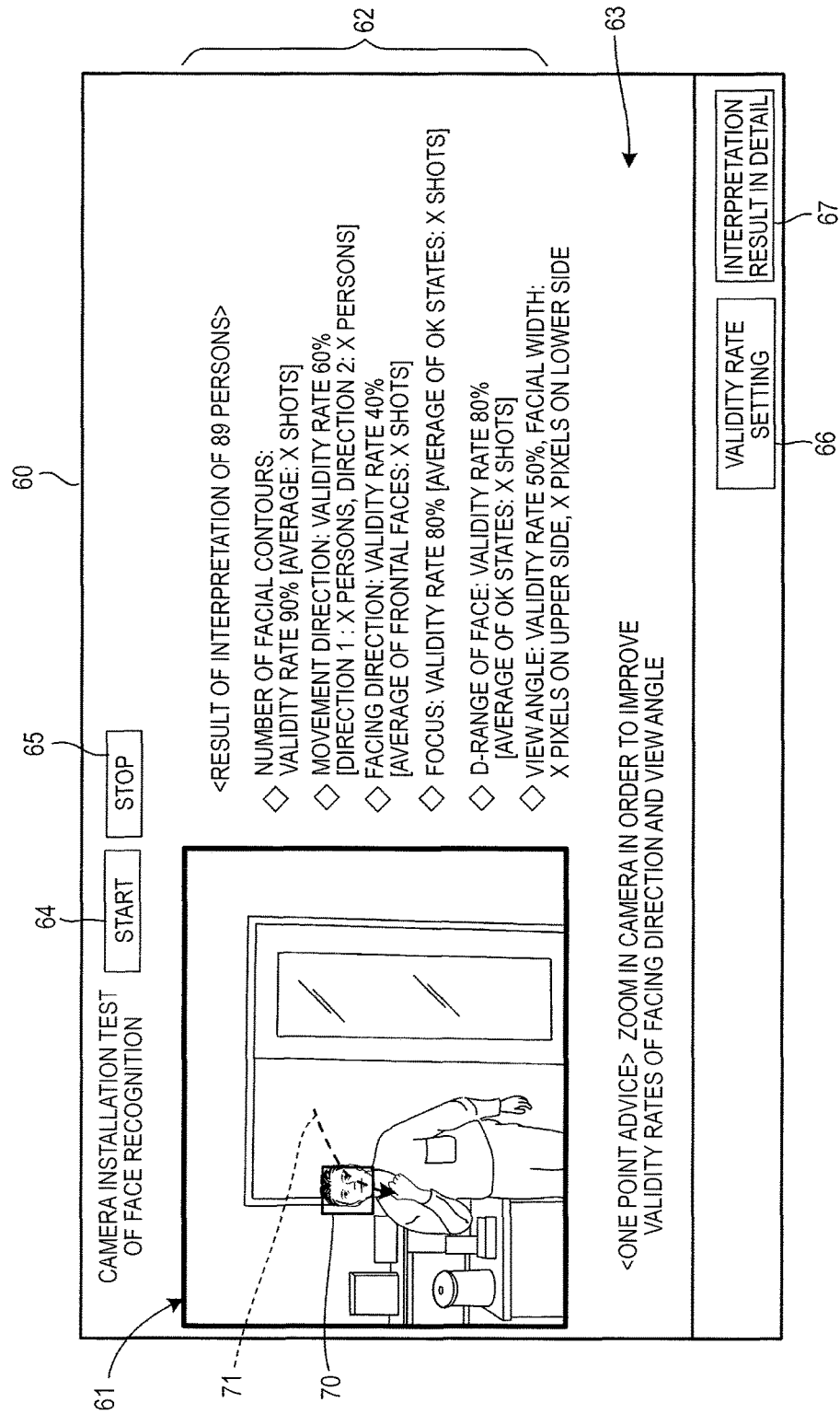
FIG. 3 illustrates an example of a screen of an installed camera displayed on a user presentation unit of the optimum camera setting device in FIG. 1.

FIG. 3 illustrates an example of a screen of an installed camera displayed on the user presentation unit 5. In the drawing, the screen 60 of an installed camera displays a live video image (real-time image captured by camera 2) 61, an interpretation result 62, a correction suggestion 63, a START button 64 for starting a camera installation test of face recognition, a STOP button 65 for ending the camera installation test of face recognition, a validity rate setting button 66 for setting the validity rate, and an interpretation result in detail button 67 for displaying an interpretation result in detail. Facial contours 70 and a movement route 71 are overlapped in the live video image 61.

When the START button 64 is pressed, image-capturing is performed for ten minutes, for example. After performing the image-capturing for ten minutes, an interpretation result regarding the number of persons (for example, 89 visitors as described above) who have visited a store for ten minutes is displayed as the validity rate. Numerals of the validity rate of the validated item are displayed in characters with a particular color (for example, in red). The example of FIG. 3 illustrates that three items of "the number of facial contours", the "focus" and the "D-range of face" are validated (that is, the example indicates that the three items are favorably installed by a builder). When there is any invalidated item after the interpretation, advice for being validated is displayed as the correction suggestion 63. In the example of FIG. 3, the "movement direction", the "facing direction" and the "view angle" are invalid, and the advice is displayed as the correction suggestion 63 encouraging that the validity rates of the "facing direction" and the "view angle" are improved when zoomed in. When stopping the image-capturing in the middle, the STOP button 65 is pressed.

Figure 4:
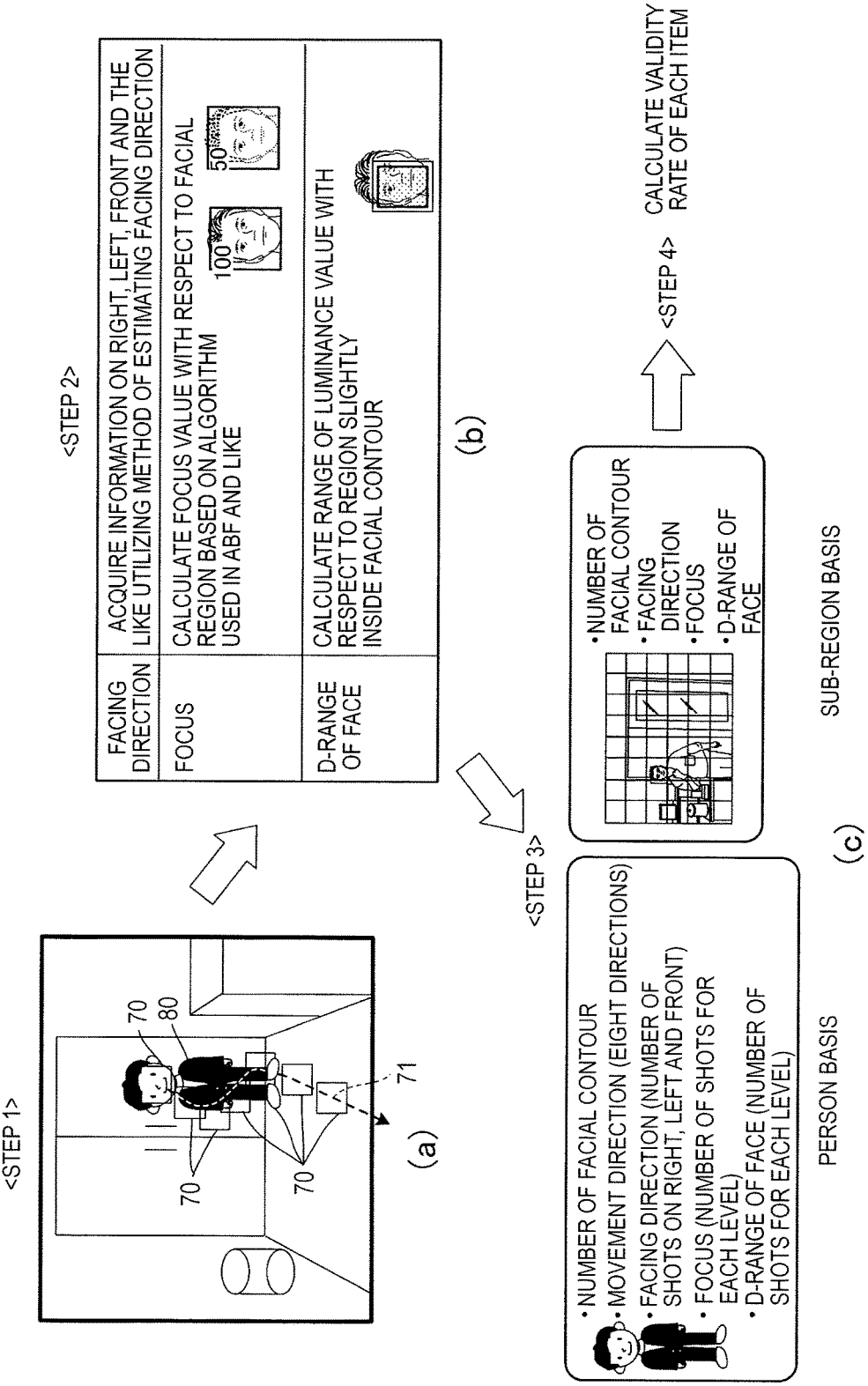
In FIG. 4, (a) to (c) are schematic views illustrating a procedure of a validity rate calculation in the camera installation validity rate calculation portion of the optimum camera setting device in FIG. 1.

FIGS. 4(a) to 4(c) are schematic views illustrating a procedure of a validity rate calculation in the camera installation validity rate calculation portion 41. In the drawing, as initially illustrated in FIG. 4(a), the movement route 71 is extracted based on the facial contours 70 set to a store visitor 80 (Step 1). FIG. 4(a) is a case where seven facial contours 70 are acquired in total, and the facial contours 70 are connected in a line to obtain the movement route 71. After extracting the movement route, as illustrated in FIG. 4(b), the facing direction, the focus and the D-range of face are calculated for each facial contour 70 (Step 2). When calculating the facing direction, information on the right, left, front and the like are acquired utilizing a method of estimating the facing direction in the related art.

When calculating the focus, a focal value with respect to a facial region is calculated based on an algorithm used in auto-back focus (ABF).

The numerals "100" and "50" indicated in the drawing the focal values, and as the numeral becomes greater, a better focus is achieved. When calculating the D-range of face, a range of the luminance value is calculated with respect to a region slightly inside the facial contour. After calculating the facing direction, the focus and the D-range of face for each facial contour 70, the store visitor information on a person basis (information regarding setting items other than view angle) is created and the store visitor information on a sub-region basis (information regarding view angle) is created (Step 3). As a person-based setting items, there are five items illustrated in FIG. 2 as contents, that is, "the number of facial contours", the "movement direction (eight directions)", the "facing direction (the number of shots on the right, left and front)", the "focus (the number of shots for each level)" and the "D-range of face (the number of shots for each level)", and the validity rate of each item is calculated (Step 4). In a case of sub-region-based item, the region is settled by the balance of the facial contour. Additionally, in a case of sub-region-based item, the validity rate is calculated as a cumulative value of the overall facial contours.

FIG. 5 describes an example of determining necessity of correction for camera installation in a camera installation correction necessity determination portion 42. In the drawing, "ratio of the number of persons exceeding threshold value of the number of facial contours" corresponds to the number of facial contours. "Ratio of the number of persons for each direction (including facing direction)" corresponds to the movement direction and the facing direction. "Frequency map of face detection for each sub-region" and "average size of detected face in each sub-region" correspond to the view angle. "Ratio M %" in the drawing corresponds to the validity rate. The ratio M % is 80%, for example. When the "ratio of the number of persons exceeding threshold value of the number of facial contours" is equal to or greater than the ratio M %, the condition of the camera installation is favorable, thereby determining that no correction is required.

(1) When the "ratio of the number of persons exceeding threshold value of the number of facial contours" is lower than the ratio M %, and the "ratio of the number of persons for each direction" is "a few of 'up to down', that nearly means 'mostly oblique'" (that is, ratio for store visitor moving from upper half to lower half of captured image is low), there is a need to correct the camera installation, thereby instructing a positional change of the camera 2. For example, an instruction is presented so as to set the movement route to be straight.

(2) When the "ratio of the number of persons exceeding threshold value of the number of facial contours" is lower than the ratio M %, the "ratio of the number of persons for each direction" is "plenty of 'up to down'" (that is, ratio for store visitor moving from upper half to lower half of captured image is high), "frequency (frequency of face detection) of lower half region of captured image is high (that nearly means that face cannot be imaged at entrance)", and "size of detected face in upper half region of captured image is small", there is a need to correct the camera installation so that an instruction is presented so as to cause the camera 2 to zoom in.

(3) When the "ratio of the number of persons exceeding threshold value of the number of facial contours" is lower than the ratio M %, the "ratio of the number of persons for each direction" is "plenty of 'up to down'" (that is, ratio for store visitor moving from upper half to lower half of captured image is high), "frequency (frequency of face detection) of lower half region of captured image is high (that nearly means that face cannot be imaged at entrance)", and "size of detected face in upper half region of captured image is other than small", there is a need to correct the camera installation, thereby instructing the positional change of the camera 2. The case denotes a state where there are plenty of persons looking down in the vicinity of the entrance so that an instruction is presented so as to cause the camera 2 to be lowered in installation height and to cause a distance between the camera and the entrance to be lengthened, for example.

(4) When the "ratio of the number of persons exceeding threshold value of the number of facial contours" is lower than the ratio M %, the "ratio of the number of persons for each direction" is "plenty of 'up to down'" (that is, ratio for store visitor moving from upper half to lower half of captured image is high), "frequency of upper half region of captured image is high (that nearly means that face only at entrance can be imaged)", and "size of detected face in upper half region of captured image is large", there is a need to correct the camera installation so that an instruction is presented so as to cause the camera 2 to be wide-angled.

(5) When the "ratio of the number of persons exceeding threshold value of the number of facial contours" is lower than the ratio M %, the "ratio of the number of persons for each direction" is "plenty of 'up to down'" (that is, ratio for store visitor moving from upper half to lower half of captured image is high), "frequency of upper half region of captured image is high (that nearly means that face only at entrance can be imaged)", and "size of detected face in upper half region of captured image is other than large", there is a need to correct the camera installation, thereby instructing the positional change of the camera 2. The case denotes a state where an angle of depression (facing direction) of the camera 2 is great so that the instruction is presented so as to cause the camera 2 to be lowered in installation height and to cause a distance between the camera and the entrance to be lengthened, for example.

Figure 6:
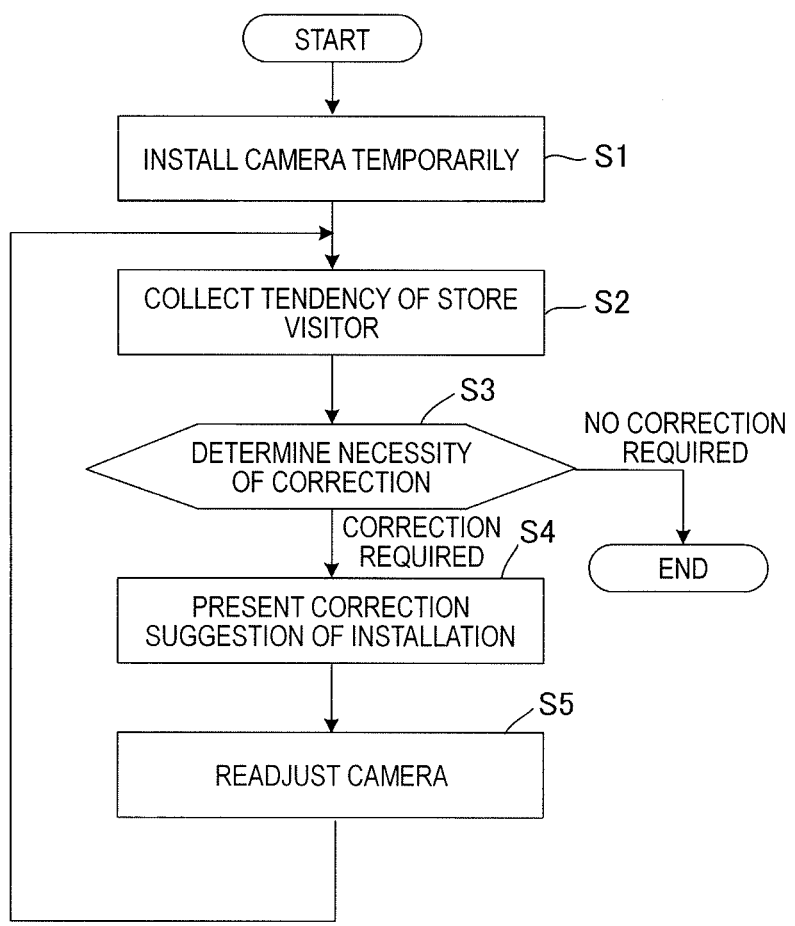
FIG. 6 is a flow chart illustrating an installation procedure of a camera in the optimum camera setting device in FIG. 1.

FIG. 6 is a flow chart illustrating an installation procedure of the camera 2. In the drawing, initially, the camera 2 is temporarily installed (Step S1). After the camera 2 is temporarily installed, the optimum camera setting device 1 is started to operate. When the optimum camera setting device 1 is started to operate, the store visitor tendency analysis unit 3 collects a tendency of a store visitor (Step S2). That is, the person tracking portion 31 detects a person from an image which is captured by the camera 2 and tracks the detected person, and the person interpretation portion 32 extracts the items including the number of face detections, the movement direction, the facing direction, the focus, the dynamic range and the view angle as the store visitor information with respect to the person who is tracked by the person tracking portion 31. The person interpretation portion 32 divides the captured image into the small regions and creates the store visitor information for each sub-region in addition to the store visitor information for each tracked person. Then, the store visitor information which is created on a person basis is stored in the person-basis store visitor information storage portion 33, and the store visitor information which is created on a sub-region basis is stored in the sub-region-basis store visitor information storage portion 34.

After the store visitor tendency analysis unit 3 collects the tendency of the store visitor, the camera installation condition estimation unit 4 estimates whether the installation conditions including the installation position, the height, the view angle and the focus of the camera 2 are appropriate based on the store visitor information on a person basis or on a sub-region basis which is extracted by the store visitor tendency analysis unit 3, and determines whether or not there is an item which needs correction based on a result of the estimation (Step S3). In the determination, when no item needs correction (that is, in case of no correction), the processing ends. When there is any item which needs correction (that is, in case of requiring correction), the user presentation unit 5 presents an installation correction suggestion of the camera 2 (Step S4).

After the user presentation unit 5 presents the installation correction suggestion of the camera 2, a user (that is, "builder") readjusts the camera 2 in accordance with the installation correction suggestion (Step S5). After readjusting the camera 2, the store visitor tendency analysis unit 3 recollects the tendency of the store visitor. The user readjusts the camera 2 in accordance with the installation correction suggestion whenever it is presented until the validity rate is achieved in the overall items. The readjustment is performed in accordance with the installation correction suggestion with respect to the item having a low validity rate so that the camera 2 can be easily set in the optimum position compared to that in the related art which has performed the adjustment through trial and error, thereby achieving an improvement in operational efficiency.

According to the optimum camera setting device 1 of the present embodiment, there are provided the camera 2 that images a subject; the person tracking portion 31 that detects a person from the image which is captured by the camera 2 and tracks the detected person; the person interpretation portion 32 that extracts items including the number of face detections, the movement direction, the facing direction, the focus, the dynamic range and the view angle as the store visitor information with respect to the person who is tracked by the person tracking portion 31; the camera installation condition estimation unit 4 that estimates whether the installation conditions including the installation position, the height, the view angle and the focus of the camera 2 are appropriate based on the store visitor information which is extracted by the person interpretation portion 32; and the user presentation unit 5 that presents a result estimated by the camera installation condition estimation unit 4. Therefore, a user can be presented with the installation conditions including the installation position, the height, the view angle and the focus of a camera 2 which are optimum for the image recognition processing such as the facial collating, and the estimating of age and gender so that the user can simply perform the setting of the installation position, the height, the view angle, the focus and the like of the camera 2, thereby achieving an improvement in the operational efficiency.

In the optimum camera setting device 1 of the present embodiment, the camera installation correction necessity determination portion 42 may be configured to output an attention to the user presentation unit 5 to cause a resolution and a frame rate of the camera 2 to change.

Figure 7:
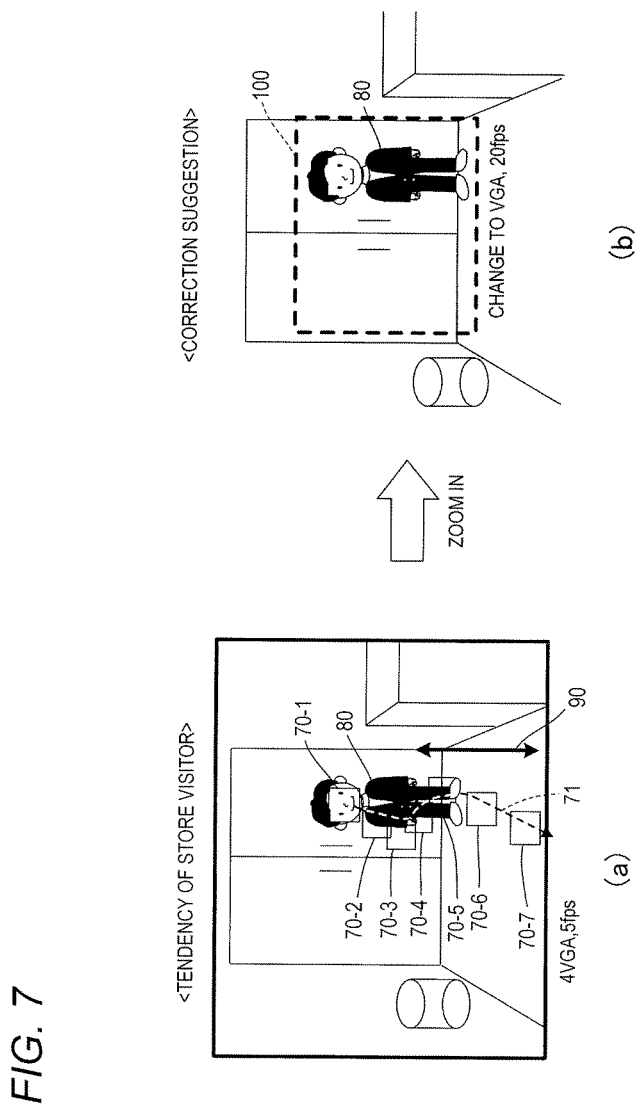
In FIG. 7, (a) and (b) are views illustrating an example in which a resolution and a frame rate are presented as correction suggestions in the optimum camera setting device in FIG. 1.

FIGS. 7(*a*) and 7(*b*) illustrate an example in which the resolution and the frame rate are presented as the correction suggestion. FIG. 7(*a*) is a captured image of an entrance of a store and the vicinity thereof having a resolution of 4 VGA (1,280×960 pixels) and a frame rate of 5 fps. As illustrated in the drawing, when four shots (70-1 to 70-4) of facial contour in which the face of the store visitor 80 exhibits the frontal face, one shot (70-5) of side face, and two shots (70-6, 70-7) of face downward are acquired, as a tendency of the store visitor, it is difficult to image the frontal face within a section indicated by an arrow 90.

Based on the store visitor information on a sub-region basis, areas in which the store visitor 80 exhibits the frontal face are calculated, thereby settling a position of an area to be intensively imaged, a resolution and a frame rate. When the area is short in length (that is, when the area is small), VGA (640×480 pixels) and a frame rate of 20 fps are employed. When the area is long in length (that is, when the area is large), 4 VGA and the frame rate of 5 fps (no change) are employed. In addition to the acquired resolution and the frame rate, an image of the view angle to be changed is presented. FIG. 7(b) illustrates an image of the view angle. The square indicated by the reference number 100 is a new view angle (zoom-in view angle). A comment saying "Adjust to VGA, 20 fps" is displayed under the new view angle 100. By following the instruction and performing the adjustment, the user can perform the setting in which the frontal face of the store visitor 80 can be clearly acquired.

In the optimum camera setting device 1 of the present embodiment, although the correction suggestion is presented in characters, the correction suggestion may be presented in an image. Naturally, a combination thereof may be employed. FIGS. 8(a) and 8(b) illustrate an example in which the correction suggestion is presented by using an image. In FIG. 8(a), a zoom ratio is specified using an image. This corresponds to the frame of the new view angle 100 illustrated in FIG. 7(b) which is indicated in red, for example. As the position for the camera installation, an arrow 110 which is in a direction opposite to the main movement direction of the store visitor, and a star sign 111 are superimposed to be displayed in the captured image. In this case, the star sign 111 indicates the position of the camera 2. The frontal face of the store visitor can be easily imaged by directing the camera 2 upward. In FIG. 8(b), the zoom ratio of a wide angle is settled based on the number of pixels (the number of pixels in facial contour 70 such as 30, 32, 36 and so on) which is indicated right next to the facial contour 70. For example, when the minimum size for facial recognition (minimum value available for facial recognition) is "20", the wide angle is zoomed 1.5 times.

Other than presenting the correction suggestion using an image, the remaining number of corrections may be presented. For example, when it is determined that there are plenty of shots oblique in the movement direction, the remaining number of corrections is set to be three times. In this case, the position of the camera is corrected at the first time, the up-down direction (tilting) of the view angle is corrected at the second time, and the magnification (zooming) of the view angle is corrected at the third time.

In the optimum camera setting device 1 of the present embodiment, as a hardware configuration of the store visitor tendency analysis unit 3 and the camera installation condition estimation unit 4, a computer provided with a central processing unit (CPU), a volatile memory such as a RAM, a non-volatile memory such as a ROM, and an interface can be used.

A program in which functions of the optimum camera setting device 1 of the present embodiment are described may be stored in a storage medium such as a magnetic disk, a hard disk, an optical disk, a magneto-optical disk and a semiconductor memory to be distributed.

(Embodiment 2)

Figure 9:
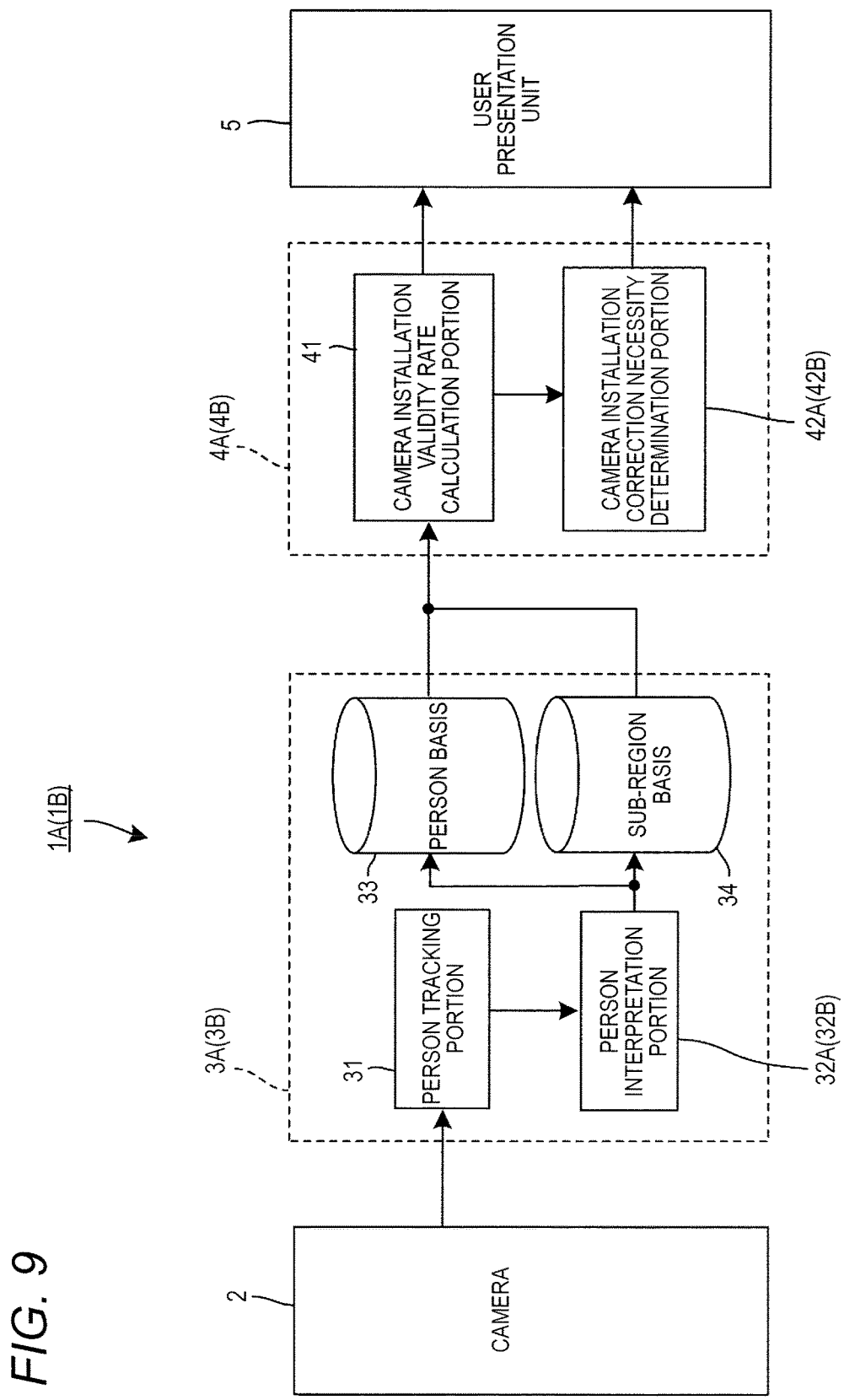
FIG. 9 is a block diagram illustrating a schematic configuration of the optimum camera setting device according to Embodiment 2 of the present invention.

FIG. 9 is a block diagram illustrating a schematic configuration of an optimum camera setting device according to Embodiment 2 of the present invention. In the drawing, the same reference numerals/signs are applied to the units or the portions common with those in FIG. 1. An optimum camera setting device 1A of the present embodiment illustrated in FIG. 9 includes the camera 2 that images an imaging range, a store visitor tendency analysis unit 3A, an imaging range settlement unit (imaging range settlement section) 4A and the user presentation unit 5. The camera 2 has the image sensors such as the CCD, and the CMOS, thereby outputting an image captured by the image sensors.

The store visitor tendency analysis unit 3A includes the person tracking portion 31, a person interpretation portion 32A, the person-basis store visitor information storage portion 33 and the sub-region-basis store visitor information storage portion 34. The person tracking portion 31 detects a person from an image which is captured by a camera 2 and tracks the detected person. The person interpretation portion 32A (movement route extraction section, facing direction detection section) calculates the movement route of the person with respect to the person who is tracked by the person tracking portion 31. The person interpretation portion 32A extracts the items including the number of face detections, the movement direction, the facing direction, the focus, the dynamic range and the view angle as the store visitor information with respect to the person who moves in the movement route. The person interpretation portion 32A divides the captured image into small regions (hereinafter, referred to as "sub-region") and creates the store visitor information for each small region in addition to the store visitor information for each tracked person. Here, the store visitor information on a sub-region basis denotes information regarding the view angle. The store visitor information on a person basis denotes information regarding setting items (setting items will be described afterwards) other than the view angle.

The person-basis store visitor information storage portion 33 stores the store visitor information which is created on a person basis. The sub-region-basis store visitor information storage portion 34 stores the store visitor information which is created on a sub-region basis. The person-basis store visitor information storage portion 33 and the sub-region-basis store visitor information storage portion 34 are configured to be a storage unit such as a hard disk or a flash memory. In the optimum camera setting device 1A according to the present embodiment, the person-basis store visitor information storage portion 33 and the sub-region-basis store visitor information storage portion 34 are configured to be in one storage unit. However, the storage portions 33 and 34 may be respectively configured to be in exclusive storage units.

The imaging range settlement unit 4A has the camera installation validity rate calculation portion 41 and the camera installation correction necessity determination portion 42A. The imaging range settlement unit 4A estimates whether the installation conditions including the installation position, the height, the view angle and the focus of the camera 2 are appropriate based on the store visitor information on a person basis or on a sub-region basis which is extracted by the person interpretation portion 32A of the store visitor tendency analysis unit 3A, and settles the imaging range of the camera 2 based on the ratio of the frontal face in the movement route and the position of the frontal face. The camera installation validity rate calculation portion 41 sets a validity criterion for the store visitor information for each tracked person (that is, on a person basis) and outputs a ratio of the number of persons exceeding the validity criterion as a validity rate. The camera installation validity rate calculation portion 41 redivides the store visitor information for each sub-region (that is, on a sub-region basis) into an upper half and a lower half of the captured image and calculates the validity rate at a frequency of the upper half and the lower half.

The camera installation correction necessity determination portion 42A settles the imaging range of the camera 2 based on the ratio of the frontal face in the movement route and the position of the frontal face, in addition to performing operations similar to those of the camera installation correction necessity determination portion 42 in the optimum camera setting device 1 of Embodiment 1 described above. The user presentation unit (presentation section) 5 has the display such as the liquid crystal indicator and the like, and presents the imaging range which is settled by the imaging range settlement unit 4A (that is, "displays").

Figure 10:
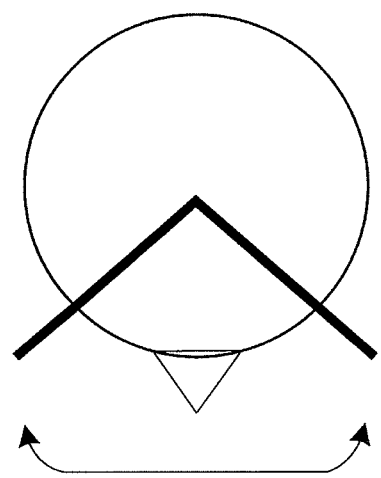
FIG. 10 is a diagram for defining the term frontal face in the optimum camera setting device in FIG. 9.
Figure 11:
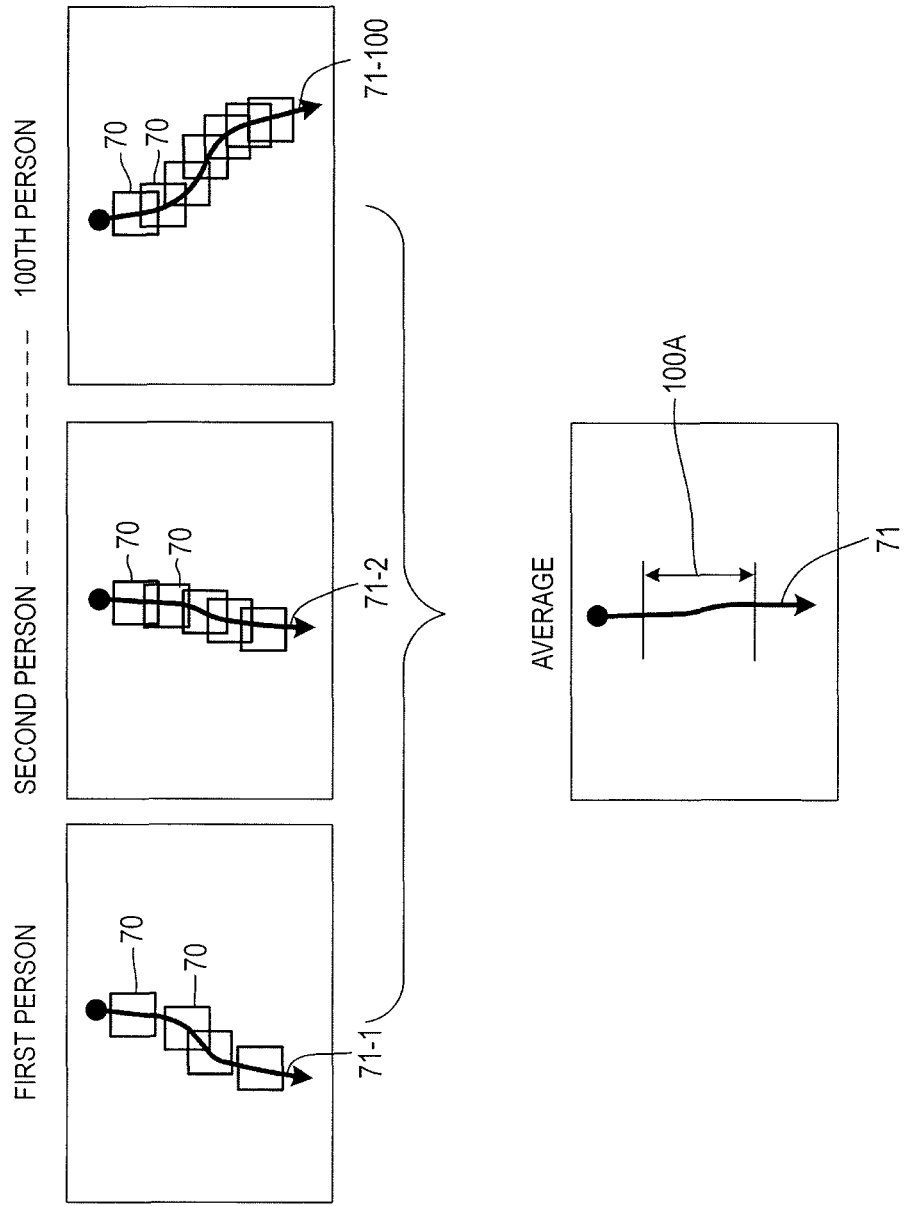
FIG. 11 is a diagram for defining the term movement route in the optimum camera setting device in FIG. 9.

Subsequently, an operation of the optimum camera setting device 1A of the present embodiment will be described. For the benefit of describing the operation, the frontal face is defined as illustrated in FIG. 10. That is, the frontal face ranges 30 degrees to both the right and left from the center of the face, and when the face is taken within this range, it is considered to be the frontal face. As illustrated in FIG. 11, the movement route 71 is an average of the movement routes 71-1, 71-2, . . . , and 71-100 of a plurality of persons (approximately 100 persons).

The number of facial images in which the faces (including frontal face) of persons who move along the movement route 71 is detected is an average of shots of the faces of the persons who move along the movement route 71 detected by the person interpretation portion 32A. In FIG. 11, each "square" indicates the facial contour 70.

Initially, the ratio of the frontal face in the movement route 71 and a range 100A including the frontal faces are calculated. Then, a starting point (Xs, Ys) and an ending point (Xe, Ye) of the frontal faces are calculated. Here, the ratio of the frontal face in the movement route 71 denotes the ratio of the frontal face with respect to the overall facial contours 70.

Figure 12:
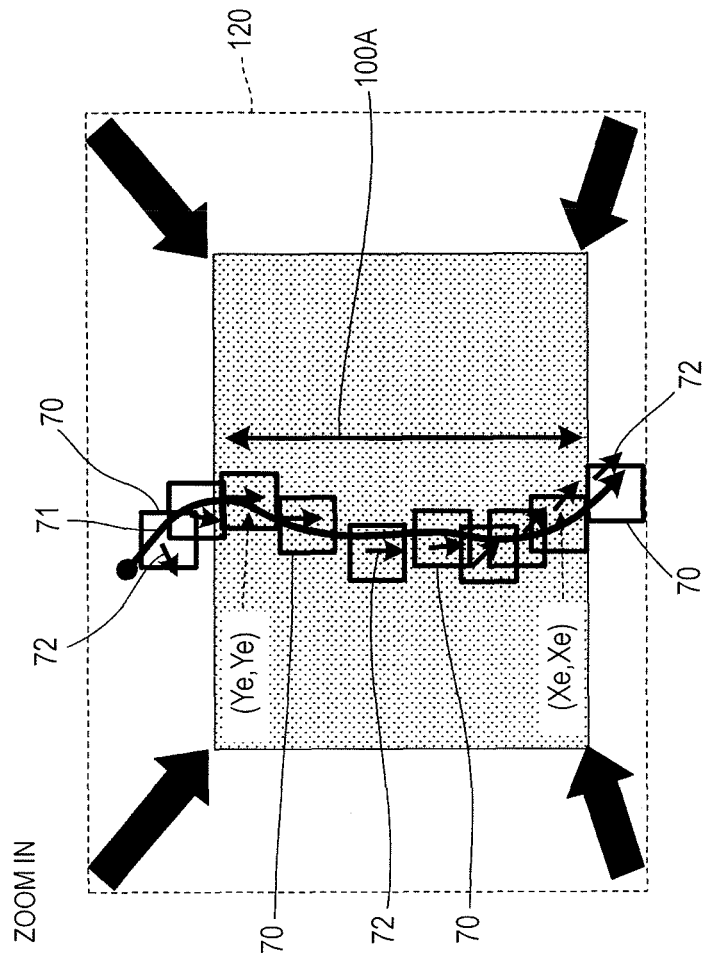
FIG. 12 describes an operation of the optimum camera setting device in FIG. 9, and the view schematically illustrates the operation when a ratio of the frontal face is equal to or lower than 80% while there is one range which includes the frontal face, and when the number Nf of facial contours is equal to or greater than a threshold value Nt.

[A] A case where the ratio of the frontal face is equal to or lower than 80% while there is one range 100A which includes the frontal face FIG. 12 schematically illustrates an operation when the ratio of the frontal face is equal to or lower than 80% while there is one range 100A which includes the frontal face, and when the number Nf of facial contours is equal to or greater than the threshold value Nt. Arrows 72 illustrated in the drawing indicate the facing directions. When the ratio of the frontal face is equal to or lower than 80% while there is one range 100A which includes the frontal face, the number Nf of facial contours of the frontal faces in the movement route 71 is calculated.

(a) A case where the calculated number Nf of facial contours is equal to or greater than the threshold value Nt An advice is presented so as to zoom in to a region which ranges from the starting point (Xs, Ys) to the ending point (Xe, Ye) of the frontal faces in the range 100A of the frontal faces. In a case illustrated in FIG. 12, since the overall number of the facial contours counts "ten" in the movement route 71 and the number Nf of facial contours of the frontal faces counts "seven", the ratio of the frontal face is 70%, thereby satisfying the condition of being equal to or lower than 80%. When the threshold value Nt is set to "5", the number Nf of facial contours becomes equal to or greater than the threshold value Nt, and thus, an advice is presented so as to zoom in to the region which ranges from the starting point (Xs, Ys) to the ending point (Xe, Ye) of the frontal faces. That is, the previous view angle 120 is narrowed so as to be able to take seven extended frontal faces from the starting point (Xs, Ys) to the ending point (Xe, Ye).

In this manner, when there is one range 100A in which the facing directions of the persons exhibit the frontal faces while the number Nf of facial contours of the frontal faces in the range 100A is equal to or greater than the threshold value Nt, an advice is presented so as to set the imaging range of the camera 2 to be the range 100A.

Figure 13:
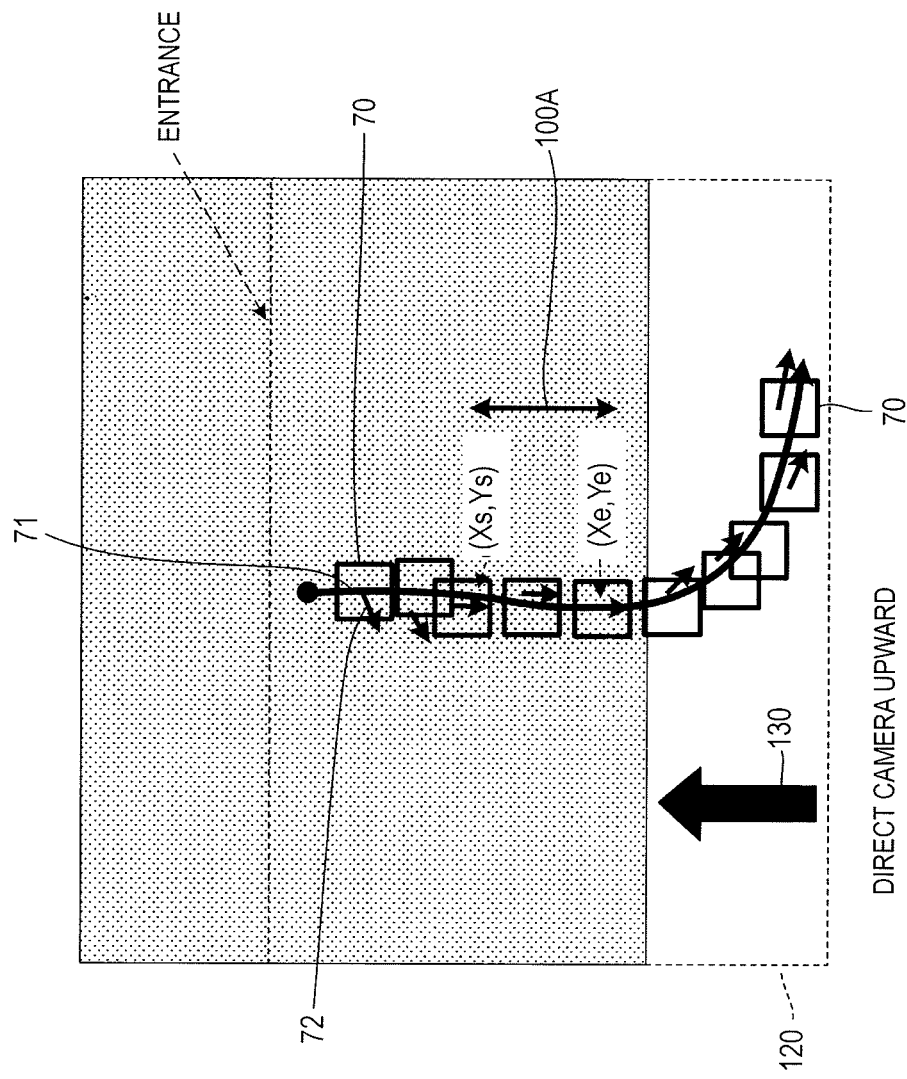
FIG. 13 describes another operation of the optimum camera setting device in FIG. 9, and the view schematically illustrates the operation when the ratio of the frontal face is equal to or lower than 80% while there is one range which includes the frontal face, and when the number Nf of facial contours is less than the threshold value Nt.

(b) A case where the calculated number Nf of facial contours is less than the threshold value Nt In the above case (a), the number Nf of facial contours is equal to or greater than the threshold value Nt. However, when the number Nf of facial contours is less than the threshold value Nt, an advice is presented so as to direct the camera 2 upward and so as to cause the ending point (Xe, Ye) of the frontal face to come to a lower side of the screen. FIG. 13 schematically illustrates the operation when the number Nf of facial contours is less than the threshold value Nt. In the drawing, since the overall number of the facial contours counts "ten" in the movement route 71 and the number Nf of facial contours in the range 100A of the frontal faces counts "three", the number Nf of the facial contours is less than the threshold value Nt ("5"). In this case, an arrow 130 directed upward is indicated so as to direct the camera 2 upward, and an advice is presented therebelow commenting "Direct the camera upward". For example, in a monitoring camera installed in a store, when an upper side of the view angle 120 corresponds to the entrance, since there is high probability to take more shots of the frontal faces at the entrance, an advice is presented so as to direct the camera 2 upward, and thus, more frontal faces can be imaged.

In this manner, when there is one range 100A in which the facing directions of the persons exhibit the frontal faces while the number Nf of facial contours of the frontal faces in the range 100A is less than the threshold value Nt, an advice is presented so as to set the lower side of the imaging range of the camera 2 to be the lower side of the range 100A.

Figure 14:
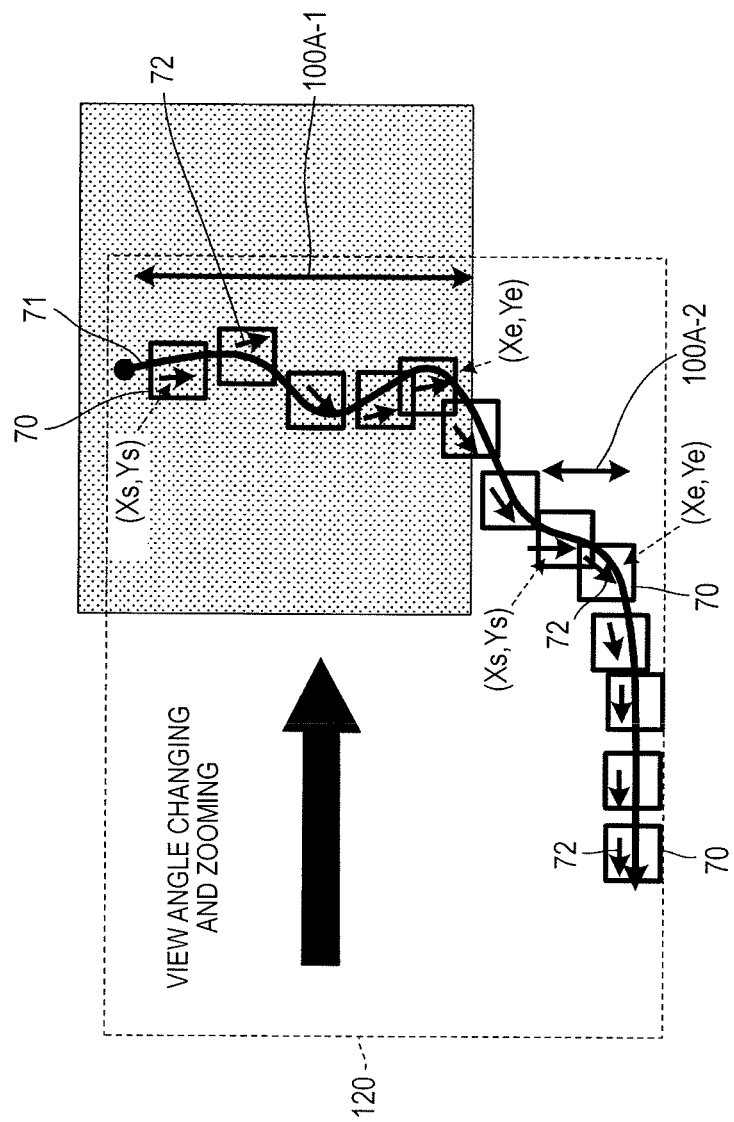
FIG. 14 describes another operation of the optimum camera setting device in FIG. 9, and the view schematically illustrates the operation when the ratio of the frontal face is equal to or lower than 80% while there are a plurality of ranges each of which includes the frontal face, and when the number Nf of facial contours is equal to or greater than the threshold value Nt.

[B] A case where the ratio of the frontal face is equal to or lower than 80% while there are a plurality of ranges including the frontal faces FIG. 14 schematically illustrates the operation when the ratio of the frontal face is equal to or lower than 80% while there are the plurality of ranges including the frontal face, and when the number Nf of facial contours is equal to or greater than the threshold value Nt. The arrows 72 illustrated in the drawing respectively indicate directions of the faces. The number Nf of facial contours of the frontal faces is calculated for each of two ranges 100A-1 and 100A-2 of the frontal faces.

(c) A case where there is a range in which the calculated number Nf of facial contours is equal to or greater than the threshold value Nt After calculating the number Nf of the facial contours in each of two ranges 100A-1 and 100A-2 of the frontal faces, when there is a range which is equal to greater than the threshold value Nt, an advice is presented so as to zoom in to the region within the range. In the case illustrated in FIG. 14, since the overall number of the facial contours counts "thirteen" in the movement route 71 and the number Nf of facial contours of the frontal faces in the range 100A-1 of the frontal faces counts "five", the number Nf of the facial contours of the frontal faces in the range 100A-2 of the frontal faces becomes "2". Therefore, the ratio of the frontal face is approximately 38.5% in the range 100A-1 of the frontal face, and the ratio of the frontal face is approximately 15.4% in the range 100A-2 of the frontal faces, thereby satisfying the condition of being equal to or lower than 80%. However, since the threshold value Nt is "5", the range 100A-1 becomes the only range in which the number Nf of the facial contours is equal to or greater than the threshold value Nt. In such a case, an advice is presented so as to zoom in to the region which ranges from the starting point (Xs, Ys) to the ending point (Xe, Ye) of the frontal faces in the range 100A-1 of the frontal face. That is, the previous view angle 120 is narrowed so as to take five extended frontal faces from the starting point (Xs, Ys) to the ending point (Xe, Ye). In this case, the zooming is performed while moving the previous view angle 120 aside to the right.

In this manner, when there are two or more ranges in each of which the facing directions of the persons exhibit the frontal faces while the number Nf of facial contours of the frontal faces in any one range out of two or more ranges is equal to or greater than the threshold value Nt, an advice is presented so as to set the range to be the imaging range of the camera 2.

Figure 15:
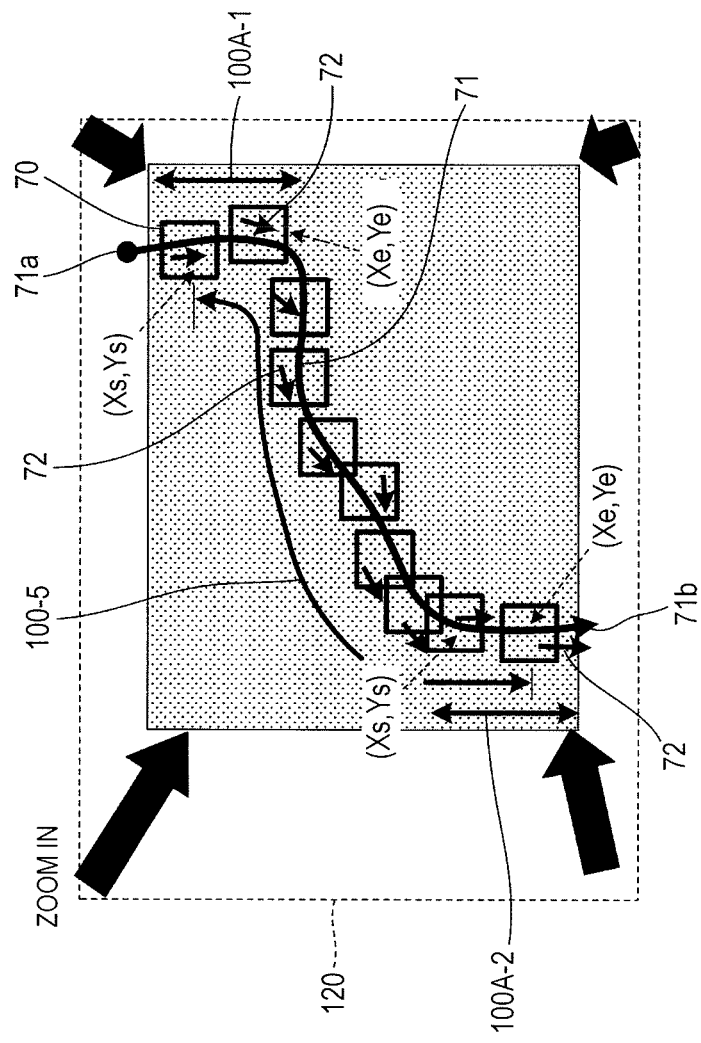
FIG. 15 describes another operation of the optimum camera setting device in FIG. 9, and the view schematically illustrates the operation when the ratio of the frontal face is equal to or lower than 80% while there are the plurality of ranges each of which includes the frontal face, and when the number Nf of facial contours for the overall frontal faces is less than the threshold value Nt.

(d) A case where the number Nf of facial contours of the overall frontal faces is less than the threshold value Nt An advice is presented so as to zoom in to the region which range from (Xs, Ys) which is the closest to a starting point 71a in the movement route 71 to (Xe, Ye) which is the closest to an ending point 71b in the movement route 71. That is, an advice is presented in order to raise the ratio of the frontal face with respect to that in the previous view angle 120. Needless to mention, the advice to raise the ratio of the frontal face is similarly applied to the cases (a) to (c) described above. FIG. 15 schematically illustrates the operation when the ratio of the frontal face is equal to or lower than 80% while there are the plurality of ranges each of which includes the frontal face, and when the number Nf of facial contours for the overall frontal faces is less than the threshold value Nt. The arrows 72 illustrated in the drawing respectively indicate directions of the faces.

In the case illustrated in FIG. 15, since the overall number of the facial contours counts "ten" in the movement route 71, the number Nf of facial contours of the frontal faces in the range 100A-1 of the frontal faces counts "two", and the number Nf of facial contours of the frontal faces in the range 100A-2 of the frontal faces counts "two", the ratio of the frontal face is 20% in both the ranges 100A-1 and 100A-2 of the frontal faces, thereby satisfying the condition of being equal to or lower than 80% in both thereof. Since the threshold value Nt is "5", the number Nf of the facial contours is less than the threshold value Nt in both the ranges 100A-1 and 100A-2 of the frontal face. In such a case, an advice is presented so as to zoom in to have a range 100-5 which ranges from (Xs, Ys) which is the closest to the starting point 71a in the movement route 71 to (Xe, Ye) which is the closest to the ending point 71b in the movement route 71. That is, the previous view angle 120 is narrowed so as to be able to take ten extended frontal faces from (Xs, Ys) which is the closest to the starting point 71a in the movement route 71 to (Xe, Ye) which is the closest to the ending point 71b in the movement route 71.

In this manner, when there are two or more ranges in each of which the facing directions of the persons exhibit the frontal faces while the number Nf of facial contours of the frontal faces of the persons in every range out of two or more ranges is less than the threshold value Nt, an advice is presented so as to set the imaging range of the camera 2 to be from the uppermost section to the lowermost section of the imaging range out of the two or more sections.

According to the optimum camera setting device 1A of the present embodiment, when there is one range 100A in which the facing direction of the person exhibits the frontal face while the number Nf of the facial contours of the frontal faces in the range 100A is equal to or greater than the threshold value Nt, an advice is presented so as to set the imaging range of the camera 2 to be the range 100A. When the number Nf of the facial contours of the frontal faces in the range 100A is less than the threshold value Nt, an advice is presented so as to set the lower side of the imaging range of the camera 2 to be the lower side of the range 100A. When there are two or more ranges in each of which the facing directions of the persons exhibit the frontal faces while the number Nf of facial contours of the frontal faces in any one range out of the two or more ranges 100A-1 and 100A-2 is equal to or greater than the threshold value Nt, an advice is presented so as to set the range to be the imaging range of the camera 2. When the number Nf of facial contours of the frontal faces of the persons in every range out of two or more ranges 100A-1 and 100A-2 is less than the threshold value Nt, an advice is presented so as to set the imaging range of the camera 2 to be from the uppermost section to the lowermost section of the imaging range out of the two or more ranges 100A-1 and 100A-2. Thus, more frontal faces can be imaged. When it is used as a monitoring camera, a functional improvement can be achieved.

In the optimum camera setting device 1A of the present embodiment, as the hardware configuration of the store visitor tendency analysis unit 3A and the imaging range settlement unit 4A, the computer provided with the central processing unit (CPU), the volatile memory such as the RAM, the non-volatile memory such as the ROM, the interface and the like can be used.

A program in which functions of the optimum camera setting device 1A of the present embodiment are described may be stored in the storage medium such as the magnetic disk, the hard disk, the optical disk, the magneto-optical disk and the semiconductor memory to be distributed.

(Embodiment 3)

In the optimum camera setting device 1A of Embodiment 2 described above, advice regarding camera adjustment is presented based on the ratio of the frontal face in the movement route 71 and the position of the frontal face. However, in the optimum camera setting device of the present embodiment, advice regarding positions to be focused is presented based on the focus and the facing direction. A configuration of the optimum camera setting device of the present embodiment is similar to that of the optimum camera setting device 1A of Embodiment 2, thereby referencing FIG. 9. The reference numeral and sign 1B is applied to the optimum camera setting device of the present embodiment. The reference numeral and sign 4B is applied to the imaging range settlement unit of the optimum camera setting device of the present embodiment. The reference numeral and sign 42B is applied to the camera installation correction necessity determination portion of the imaging range settlement unit 4B. The reference numeral and sign 3B is applied to the store visitor tendency analysis unit and the reference numeral and sign 32B is applied to the person interpretation portion (movement route division section) of the store visitor tendency analysis unit 3B.

In the optimum camera setting device 1B of the present embodiment, focal values and facing directions of the overall facial contours are calculated, and an advice is presented regarding a position which is focused on a region having favorable facing directions (that is, a range having the high validity rate of facing direction). Here, the focal value denotes a degree of blur of the image, and is indicated in a value within "0 to 255". The value becomes higher within "0 to 255" as the focus becomes better. That is, the focus is the lowest at "0" and is the highest at "255"

Figure 16:
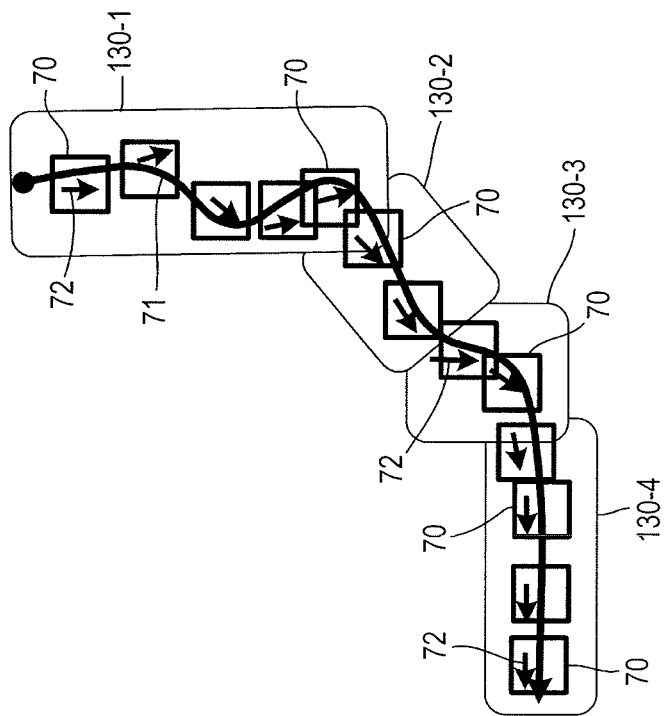
FIG. 16 is a view schematically illustrating an operation of the camera installation correction necessity determination portion of the optimum camera setting device according to Embodiment 3 of the present invention.

FIG. 16 schematically illustrates an operation of the optimum camera setting device 1B of the present embodiment. In the drawing, initially, the movement route 71 is divided into ranges for each degree of facing direction. The movement route 71 is divided into ranges by the person interpretation portion 32B. Here, the divided ranges are [Range 1] 130-1 to [Range 4] 130-4. In [Range 1] 130-1, the validity rate of facing direction is "80%", the average value of focus is "85", and the number of facial contours is "five". In [Range 2] 130-2, the validity rate of facing direction is "60%", the average value of focus is "90", and the number of facial contours is "two". In [Range 3] 130-3, the validity rate of facing direction is "95%", the average value of focus is "100", and the number of facial contours is "two". In [Range 4] 130-4, the validity rate of facing direction is "50%", the average value of focus is "120", and the number of facial contours is "four". [Range 3] 130-3 has the highest validity rate of facing direction among [Range 1] 130-1 to [Range 4] 130-4, followed by [Range 1] 130-1. However, since [Range 3] 130-3 has two facial contours, which is low, an advice is presented so as to use [Range 1] 130-1 having "five" facial contours, thereby being focused on the [Range 1] 130-1.

According to the optimum camera setting device 1B of the present embodiment, the movement route 71 is divided in accordance with the degree of the facing direction of the person, and the camera 2 is adjusted so as to be focused on the section in which the degree of the facing direction is close to that of the frontal face, and thus, more frontal faces can be favorably imaged.

In the optimum camera setting device 1B of the present embodiment, as a hardware configuration of the store visitor tendency analysis unit 3B and the imaging range settlement unit 4B, the computer provided with the central processing unit (CPU), the volatile memory such as the RAM, the non-volatile memory such as the ROM, and the interface can be used.

A program in which functions of the optimum camera setting device 1B of the present embodiment are described may be stored in the storage medium such as the magnetic disk, the hard disk, the optical disk, the magneto-optical disk and the semiconductor memory to be distributed.

The present invention has been described in detail and with reference to particular embodiments. However, it is obvious for those skilled in the art that various changes and modifications can be added without departing from the spirit and the scope of the invention.

The present application is based on Japanese Patent Application No. 2012-016700 filed on Jan. 30, 2012, the contents of which are incorporated herein by reference.

INDUSTRIAL APPLICABILITY

The present invention has an effect in that a user can be presented with installation conditions including an installation position, a height, a view angle and a focus of a camera which are optimum for image recognition processing such as facial collating, and estimating of age and gender. The present invention can be applied to a monitoring camera system which is permanently installed in buildings such as stores like convenience stores, banks and public facilities.

REFERENCE SIGNS LIST

1, 1A, 1B: optimum camera setting device
2: camera
3, 3A, 3B: store visitor tendency analysis unit
4: camera installation condition estimation unit
4A, 4B: imaging range settlement unit
5: user presentation unit
31: person tracking portion
32, 32A, 32B: person interpretation portion
33: person-basis store visitor information storage portion
34: sub-region-basis store visitor information storage portion
41: camera installation validity rate calculation portion
42, 42A, 42B: camera installation correction necessity determination portion
60: screen of installed camera
70: facial contour
71: movement route
72: facing direction
80: store visitor
100A, 100A-1, 100A-2: range of frontal face
130-1~130-4: range

The invention claimed is:

1. A camera setting device comprising:
a person tracker, configured to detect at least one person from an image captured by a camera which images a subject and to track a detected person of the at least one person;
a person interpreter, configured to:
extract a number of face detections of the tracked detected person as store visitor information with respect to the tracked detected person,
extract at least any one of a facing direction, a view angle and a movement route as the store visitor information with respect to the tracked detected person, and
divide the captured image into small regions, and create the store visitor information for each small region;
a camera installation condition estimator, configured to estimate whether an installation condition of the camera is appropriate based on the store visitor information which is extracted through the person interpreter, wherein:
the camera installation condition estimator redivides the store visitor information for each small region into an upper side and a lower side of a captured image and estimates the installation condition of the camera based on a number of face detections of the tracked detected person in each region of the upper side and the lower side of the captured image, and
the camera installation condition estimator presents an attention to cause the camera to be wider-angled than a current angle of the camera when the number of face detections of the tracked detected person in the upper side of the captured image is greater than that in the lower side thereof; and
a presenter configured to present an attention to change a setting of the camera based on an estimation result of the camera installation condition estimator.

2. A camera setting device comprising:
a person tracker, configured to detect at least one person from an image captured by a camera which images a subject and to track a detected person of the at least one person;
a person interpreter, configured to:
extract a number of face detections of the tracked detected person as store visitor information with respect to the tracked detected person,
extract at least any one of a facing direction, a view angle and a movement route as the store visitor information with respect to the tracked detected person, and
divide the captured image into small regions, and create the store visitor information for each small region;

a camera installation condition estimator, configured to estimate whether an installation condition of the camera is appropriate based on the store visitor information which is extracted through the person interpreter, wherein:
  the camera installation condition estimator redivides the store visitor information for each small region into an upper side and a lower side of a captured image and estimates the installation condition of the camera based on a number of face detections of the tracked detected person in each region of the upper side and the lower side of the captured image, and
  the camera installation condition estimator presents an attention to cause the camera to zoom in from a current zoom factor of the camera when the number of face detections of the tracked detected person in the lower side of the captured image is greater than that in the upper side thereof; and
a presenter configured to present an attention to change a setting of the camera based on an estimation result of the camera installation condition estimator.

3. A camera setting device comprising:
a person tracker, configured to detect a person from an image captured by a camera which images a subject and to track the detected person;
a person interpreter, configured to extract at least any one of a number of face detections, a facing direction, a view angle and a movement route as store visitor information with respect to the person who is tracked through the person tracker;
a camera installation condition estimator, configured to:
  estimate whether an installation condition of the camera is appropriate based on the store visitor information which is extracted through the person interpreter, and
  detect a facing direction of the person who moves in the movement route; and
a presenter, configured to:
present an attention to change a setting of the camera based on an estimation result of the camera installation condition estimator, and
present an attention to change an imaging range of the camera based on the facing direction of the person,
wherein in a case where the camera installation condition estimator detects a frontal face in each of two or more sections, and when the number of images in each of which the frontal face of the person is detected is equal to or greater than a predetermined number of shots in one section out of the two or more sections, the presenter presents an attention to change the imaging range of the camera based on the one section out of the two or more sections.

4. A camera setting device comprising:
a person tracker, configured to detect a person from an image captured by a camera which images a subject and to track the detected person;
a person interpreter, configured to extract at least any one of a number of face detections, a facing direction, a view angle and a movement route as store visitor information with respect to the person who is tracked through the person tracker;
a camera installation condition estimator, configured to:
  estimate whether an installation condition of the camera is appropriate based on the store visitor information which is extracted through the person interpreter, and
  detect a facing direction of the person who moves in the movement route; and
a presenter, configured to:
present an attention to change a setting of the camera based on an estimation result of the camera installation condition estimator, and
present an attention to change an imaging range of the camera based on the facing direction of the person,
wherein in a case where the camera installation condition estimator detects a frontal face in each of two or more sections, and when the number of images in each of which the frontal face of the person is detected is less than a predetermined number of shots in every section of the two or more sections, the presenter presents an attention to change the imaging range to be from the uppermost section to the lowermost section of the imaging range out of the two or more sections of the imaging range.

5. A camera setting device comprising:
a person tracker, configured to detect a person from an image captured by a camera which images a subject and to track the detected person;
a person interpreter, configured to extract at least any one of a number of face detections, a facing direction, a view angle and a movement route as store visitor information with respect to the person who is tracked through the person tracker;
a camera installation condition estimator, configured to:
  estimate whether an installation condition of the camera is appropriate based on the store visitor information which is extracted through the person interpreter, and
  detect a facing direction of the person who moves in the movement route; and
a presenter, configured to:
  present an attention to change a setting of the camera based on an estimation result of the camera installation condition estimator, and
  present an attention to change an imaging range of the camera based on the facing direction of the person; and
a movement route divider, configured to divide the movement route for each degree of the facing direction of the person who is detected by the camera installation condition estimator, wherein
the presenter presents an attention to adjust the camera to focus on a section in which the degree of the facing direction is close to that of the frontal face.

6. The camera setting device according to claim 5, wherein the presenter adjusts the camera to focus on a section in which there are many shots of the frontal face among the sections in which the degree of the facing direction is close to that of the frontal face.

7. A camera setting method comprising:
detecting at least one person from an image captured by a camera which images a subject, and tracking the detected person of the at least one person;
extracting a number of face detections of the tracked detected person as store visitor information with respect to the tracked detected person;
extracting at least any one of a facing direction, a view angle and a movement route as the store visitor information with respect to the tracked detected person;
dividing the captured image into small regions and creating the store visitor information for each small region;

estimating whether an installation condition of the camera is appropriate based on the store visitor information, wherein said estimating whether an installation condition of the camera is appropriate further comprises:
  redividing the store visitor information for each small region into an upper side and a lower side of a captured image, and estimating the installation condition of the camera based on a number of face detections of the tracked detected person in each region of the upper side and the lower side of the captured image, and
  presenting an attention to cause the camera to be wider-angled than a current angle of the camera when the number of face detections of the tracked detected person in the upper side of the captured image is greater than that in the lower side thereof; and
presenting an attention to change a setting of the camera based on an estimation result of the said estimating whether an installation condition of the camera is appropriate.

8. A camera setting method comprising:
detecting at least one person from an image captured by a camera which images a subject, and tracking the detected person of the at least one person;
extracting a number of face detections of the tracked detected person as store visitor information with respect to the tracked detected person;
extracting at least any one of a facing direction, a view angle and a movement route as the store visitor information with respect to the tracked detected person;
dividing the captured image into small regions and creating the store visitor information for each small region;
estimating whether an installation condition of the camera is appropriate based on the store visitor information, wherein said estimating whether an installation condition of the camera is appropriate further comprises:
  redividing the store visitor information for each small region into an upper side and a lower side of a captured image, and estimating the installation condition of the camera based on a number of face detections of the tracked detected person in each region of the upper side and the lower side of the captured image, and
  presenting an attention to cause the camera to zoom in from a current zoom factor of the camera when the number of face detections of the tracked detected person in the lower side of the captured image is greater than that in the upper side thereof; and
presenting an attention to change a setting of the camera based on an estimation result of the said estimating whether an installation condition of the camera is appropriate.

\* \* \* \* \*